US009268898B1

(12) United States Patent
Frost et al.

(10) Patent No.: US 9,268,898 B1
(45) Date of Patent: Feb. 23, 2016

(54) ESTIMATING POWER CONSUMPTION OF A CIRCUIT DESIGN

(71) Applicant: Xilinx, Inc., San Jose, CA (US)

(72) Inventors: Alan M. Frost, Cupertino, CA (US); Matthew H. Klein, Redwood City, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 13/797,810

(22) Filed: Mar. 12, 2013

(51) Int. Cl.
    *G06F 17/50* (2006.01)

(52) U.S. Cl.
    CPC .................. *G06F 17/5081* (2013.01)

(58) Field of Classification Search
    CPC ............ G06F 17/5045; G06F 17/5072; G06F 2217/10; G06F 2217/78; G06F 17/5009; G06F 17/5022; G06F 17/5027; G06F 17/5036
    USPC .................. 716/100, 124–125, 133, 105–110
    See application file for complete search history.

(56) References Cited

U.S. PATENT DOCUMENTS

| | | | | |
|---|---|---|---|---|
| 5,847,966 A * | 12/1998 | Uchino et al. | ................ | 716/109 |
| 5,949,689 A * | 9/1999 | Olson et al. | ..................... | 703/14 |
| 7,131,078 B1 * | 10/2006 | Maheshwari et al. | ........ | 716/104 |
| 7,469,394 B1 * | 12/2008 | Hutton et al. | .................. | 716/113 |
| 7,877,555 B1 * | 1/2011 | Tessier et al. | .................. | 711/154 |
| 2002/0042887 A1 * | 4/2002 | Chauvel et al. | ............... | 713/300 |
| 2003/0009317 A1 * | 1/2003 | Dhir et al. | ......................... | 703/7 |
| 2003/0046643 A1 * | 3/2003 | Ohta et al. | ...................... | 716/4 |
| 2004/0243376 A1 * | 12/2004 | Karunaratne | ................... | 703/18 |
| 2005/0152322 A1 * | 7/2005 | Dolwin et al. | ................ | 370/338 |
| 2005/0204316 A1 * | 9/2005 | Nebel et al. | ....................... | 716/2 |
| 2005/0223344 A1 * | 10/2005 | Sato et al. | ......................... | 716/1 |
| 2006/0063987 A1 * | 3/2006 | Ota et al. | ...................... | 600/310 |
| 2006/0136793 A1 * | 6/2006 | Wang et al. | .................... | 714/718 |
| 2008/0052654 A1 * | 2/2008 | Rahmat et al. | ..................... | 716/6 |
| 2009/0119037 A1 * | 5/2009 | Khalil et al. | ..................... | 702/60 |
| 2009/0231152 A1 * | 9/2009 | Tung et al. | ..................... | 340/660 |
| 2009/0273053 A1 * | 11/2009 | Baer et al. | ..................... | 257/528 |
| 2009/0283611 A1 * | 11/2009 | Varanasi et al. | ............... | 239/366 |
| 2009/0327980 A1 * | 12/2009 | Melamed-Kohen et al. | ..... | 716/2 |
| 2010/0053182 A1 * | 3/2010 | Jeon et al. | ...................... | 345/536 |
| 2014/0180048 A1 * | 6/2014 | Keith et al. | .................... | 600/347 |

* cited by examiner

*Primary Examiner* — Paul Dinh
(74) *Attorney, Agent, or Firm* — Kevin T. Cuenot

(57) ABSTRACT

Estimating power consumption of a circuit design includes associating, using a processor, each partition of a plurality of partitions of a circuit design with a probability distribution (315). For each partition, the associated probability distribution specifies a distribution for a probability distribution parameter correlated with power consumption for the partition. Using the processor, an output probability distribution specifying power consumption of the circuit design can be calculated according to the probability distribution of each partition of the circuit design (320).

20 Claims, 2 Drawing Sheets

ESTIMATING POWER CONSUMPTION OF A CIRCUIT DESIGN

FIELD OF THE INVENTION

This specification relates to estimating power consumption of a circuit design.

BACKGROUND

Conventional circuit simulators estimate power consumption of a circuit design using a number of different techniques. One technique used to estimate dynamic power consumption of a circuit design uses average current per transition of circuit elements. For the various portions of the circuit design, the average current is determined on a per transition basis. The circuit simulator receives a user input specifying average switching activity for the various portions of the circuit design. The circuit simulator then calculates an estimate of the average dynamic power consumed by each portion of the circuit design and for the circuit design as a whole.

From the average dynamic power consumption calculation, the circuit simulator estimates peak power consumption. Typically, the peak power consumption for a circuit design is calculated by either increasing the average switching rate for each module unilaterally by a predetermined amount, e.g., 15%, or by adding a margin of error to the estimated average dynamic power consumption for the circuit design as a whole, e.g., increase the dynamic average power consumption by 15%. Thus, both the average dynamic power consumption and the peak dynamic power consumption are output as single values.

Another technique is to perform a cycle accurate simulation of the circuit design using a back annotated netlist. The back annotated netlist is used to build a current profile for the circuit design. This approach, however, is not practical due to the difficulties involved in creating a suitable test bench and the excessive runtime that is required. Moreover, in many cases, only high level models are available for one or more portions of the circuit design meaning that cycle accurate models are not available. As such, the opportunity to perform a cycle accurate simulation may be foreclosed by the lack of available models even if runtime and the ability to create a suitable test bench were not concerns.

SUMMARY

A method includes associating, using a processor, each partition of a plurality of partitions of a circuit design with a probability distribution. For each partition, the associated probability distribution specifies a distribution for a probability distribution parameter correlated with power consumption for the partition. Using the processor, an output probability distribution specifying power consumption of the circuit design is calculated according to the probability distribution of each partition of the circuit design.

A system includes a processor coupled to a memory storing program code. The processor, upon executing the program code, is programmed to initiate executable operations. The executable operations include associating each partition of a plurality of partitions of a circuit design with a probability distribution. For each partition, the associated probability distribution specifies a distribution for a probability distribution parameter correlated with power consumption for the partition. The processor is further programmed to initiate an executable operation including calculating an output probability distribution specifying power consumption of the circuit design according to the probability distribution of each partition of the circuit design.

A non-transitory computer-readable medium includes instructions which, when executed by a processor, perform a method. The method includes associating, using the processor, each partition of a plurality of partitions of a circuit design with a probability distribution. For each partition, the associated probability distribution specifies a distribution for a probability distribution parameter correlated with power consumption for the partition. Using the processor, an output probability distribution specifying power consumption of the circuit design is calculated according to the probability distribution of each partition of the circuit design.

DETAILED DESCRIPTION OF THE DRAWINGS

While the specification concludes with claims defining novel features, it is believed that the various features disclosed within this specification will be better understood from a consideration of the description in conjunction with the drawings. The process(es), machine(s), manufacture(s) and any variations thereof described within this specification are provided for purposes of illustration. Specific structural and functional details disclosed within this specification are not to be interpreted as limiting, but merely as a basis for the claims and as a representative basis for teaching one skilled in the art to variously employ the features described in virtually any appropriately detailed structure. Further, the terms and phrases used within this specification are not intended to be limiting, but rather to provide an understandable description of the features described.

This specification relates to estimating power consumption of a circuit design. In accordance with the inventive arrangements disclosed within this specification, power consumption of a circuit design is estimated with the result being provided as a probability distribution. The circuit design is divided into a plurality of different partitions. The partitions are created according to any of a variety of different partitioning criteria. Each partition is associated with one or more probability distributions specific to the partition. The particular parameter for which each probability distribution is specified is any of a variety of different probability distribution parameters that are correlated with dynamic and/or static power consumption for the partition. Using the probability distributions for each of the partitions of the circuit design, the output probability distribution is calculated, which indicates a variance of power consumption over time. The resulting probability distribution indicates a plurality of power consumption values with each value being associated with a probability that the power consumption for the circuit design will take on that value at any particular moment in time.

Within this specification, reference to "power consumption" refers to dynamic power consumption and/or static power consumption. Explicit reference to either dynamic or static power consumption will be made within this specification as "dynamic power consumption" or "static power consumption" respectively.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Figure 1:
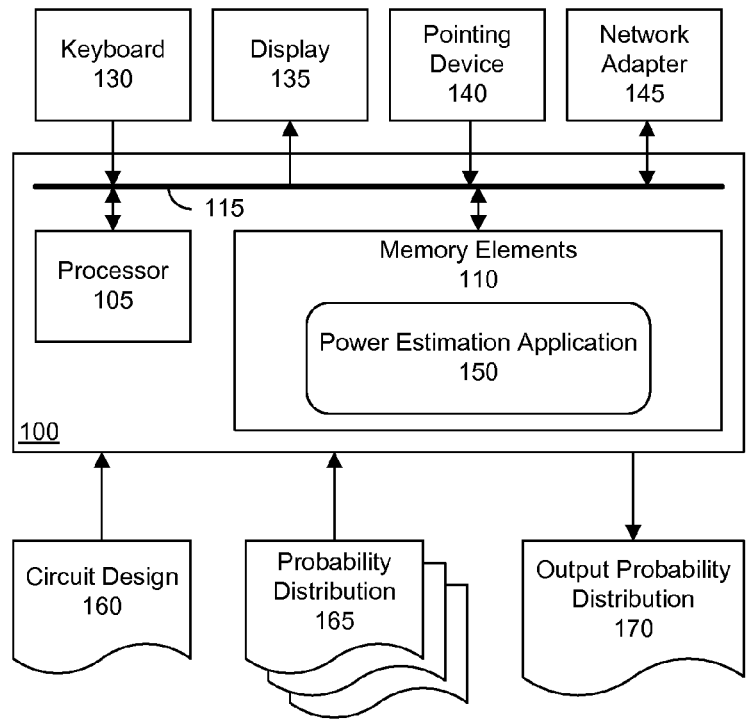
FIG. 1 is a block diagram illustrating an exemplary system for estimating power consumption for a circuit design.

FIG. 1 is a block diagram illustrating an exemplary implementation of a system 100 for estimating power consumption of a circuit design. System 100 includes at least one processor, e.g., a central processing unit (CPU), 105 coupled to memory elements 110 through a system bus 115 or other suitable circuitry. System 100 stores program code within memory elements 110. Processor 105 executes the program code accessed from memory elements 110 via system bus 115. In one aspect, system 100 is implemented as a data processing system, e.g., a computer, that is suitable for storing and/or executing program code. It should be appreciated, however, that system 100 can be implemented in the form of any system including a processor and memory that is capable of performing the functions described within this specification.

Memory elements 110 include one or more physical memory devices such as, for example, a local memory and one or more bulk storage devices. Local memory refers to random access memory or other non-persistent memory device(s) generally used during actual execution of the program code. Bulk storage device(s) can be implemented as a hard disk drive (HDD), a solid state drive (SSD), or other persistent data storage device. System 100 also can include one or more cache memories (not shown) that provide temporary storage of at least some program code in order to reduce the number of times program code must be retrieved from the bulk storage device during execution.

Input/output (I/O) devices such as a keyboard 130, a display 135, and a pointing device 140 optionally can be coupled to system 100. The I/O devices can be coupled to system 100 either directly or through intervening I/O controllers. A network adapter 145 also can be coupled to system 100 to enable system 100 to become coupled to other systems, computer systems, remote printers, and/or remote storage devices through intervening private or public networks. Modems, cable modems, Ethernet cards, and wireless transceivers are examples of different types of network adapter 145 that can be used with system 100.

As pictured in FIG. 1, memory elements 110 can store a power estimation application 150. Power estimation application 150, being implemented in the form of executable program code, is executed by system 100. As such, power estimation application 150 is considered an integrated part of system 100. Power estimation application 150, in general, operates upon a received circuit design 160 to perform an estimation of power consumption by circuit design 160. Power estimation application 150 and data operated upon by system 100, e.g., circuit designs, probability distributions, and the like, are functional data structures that impart functionality when employed as part of system 100.

System 100 receives or loads circuit design 160. Circuit design 160 can be specified in any of a variety of different programmatic forms. For example, circuit design 160 can be specified as a netlist, as one or more hardware description language files, or the like. Within system 100, circuit design 160 is divided into one or more partitions. Probability distributions 165 also are provided to system 100 as input. In one aspect, each partition of circuit design 160 is associated with one or more probability distributions 165. Using the partitioned version of circuit design 160 and probability distributions 165, system 100 calculates an output probability distribution specifying power consumption of circuit design 160, e.g., either static or dynamic. In another aspect, system 100 further generates an output probability distribution specifying total power consumption, which includes both static and dynamic power consumption.

Figure 2:
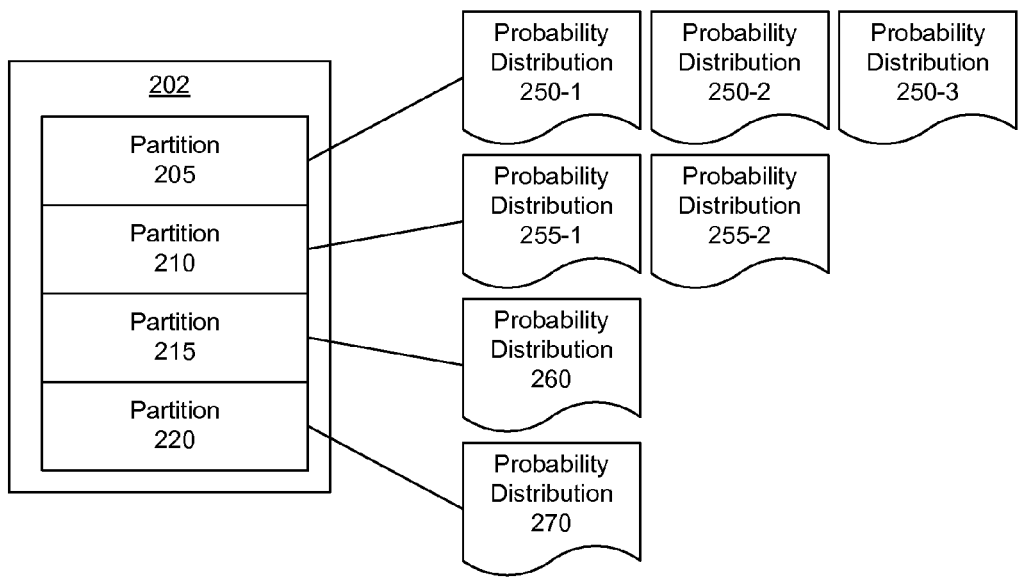
FIG. 2 is a block diagram illustrating an exemplary partitioning of a circuit design.

FIG. 2 is a block diagram illustrating an exemplary partitioning of a circuit design 202. As pictured, circuit design 202 includes a plurality of partitions labeled 205, 210, 215, and 220. Each of partitions 205-220 is associated with one or more probability distributions. Partition 205 is associated with probability distributions 250-1, 250-2, and 250-3. Partition 210 is associated with probability distributions 255-1 and 255-2. Partition 215 is associated with probability distribution 260. Partition 220 is associated with probability distribution 270. It should be appreciated that circuit design 202 can include fewer or more partitions. Each partition, however, is associated with one or more probability distributions for the calculation of an output probability distribution indicating power consumption.

Partitions of circuit design 202 can be formed according to any of a variety of different partitioning criteria. In one aspect, each of partitions 205-220 is formed according to clock domain. In that case, each of partitions 205-220 represents a different clock domain of circuit design 202, wherein the clock signal of each clock domain is independent of each other clock domain. In some cases, the clock frequency of each clock domain is different, or distinct. In other cases, the clock frequency of a clock domain is the same as that of another clock domain, but independent and, as such, can vary with regard to phase, for example.

In another aspect, each of partitions 205-220 is formed according to modules of the circuit design 202. For example, circuit design 202 can be specified in a hierarchical format in which different areas of functionality are defined as modules. In another aspect, partitions 205-220 can be defined according to component type. In still another aspect, a user can define partitions 205-220 in an arbitrary manner according to preference or other attributes.

Each of probability distributions 250-270 specifies a probability distribution for a selected probability distribution parameter. From the probability distribution parameter, an estimation of power consumption can be made. In one aspect, each probability distribution parameter for a given probability distribution is correlated with the dynamic power consumption for the associated partition. Each probability distribution specifies a variance in the particular probability distribution parameter used and, as such, for power consumption, as opposed to a single average number. Using probability distributions for partitions allows one to observe the effect of the variance in power consumption of different partitions on the power consumption of the entire circuit design.

The distribution specified by each of probability distributions 250-270 allows one to specify non-constant operation for the partitions. The distribution can be customized to reflect the actual likelihood of the partition consuming a given amount of power for various times. In one example, a probability distribution can be formatted to specify the partition name, the particular probability distribution parameter used for the probability distribution, the type of distribution (e.g., normal, etc.), the median, and the standard deviation.

As an illustrative example, a partition of the circuit design may be idle for a period of time, powered off or enter a low power mode, have an increased load for a period of time, be reconfigured to implement a different circuit structure in the case of a programmable IC, or the like. For such a partition, the probability distribution specifies a zero or another low value for situations in which the partition is expected to consume little or no power. The probability distribution indicates a value for the selected probability distribution parameter and associates that value with a probability that is indicative of the amount of time the partition is in that low power state. The probability distribution can specify other values with corresponding probabilities to indicate other states such as medium load, high load, or the like.

In further illustration, consider the case in which probability distribution 250-1 specifies a distribution for switching activity, or rate, for partition 205. Switching activity, for example, on the output of partition 205, is the selected probability distribution parameter correlated with power consumption for partition 205. As such, probability distribution 250-1 specifies one or more different switching rates for partition 205. Each switching rate within probability distribution 250-1 is associated with a probability of occurrence for partition 205.

Switching activity, however, is not the only parameter that is correlated with power consumption or, from which an estimate of power consumption can be calculated, for a partition. In another example, the probability distribution parameter indicates the amount of time that a partition spends in one or more different operating states. For example, some circuit structures consume far more power in one operating state than in another. As such, the probability distribution parameter can be specified in terms of the amount of time the partition spends in one or more different operating states. The particular operating state used will vary in accordance with the partition.

As an illustrative example, consider an enable rate for a memory. In the case of some memories, the amount of time that the memory is in an enabled operating state where the memory can be read or the memory can be written is more instructive for estimating power consumption for the memory than switching rate. For those partitions that include a memory, are dominated by memories, or are formed entirely of memories, an enable rate can be used instead of a switching rate as the probability distribution parameter. The enable rate defines the probability that the memory is enabled at any given time.

In another example, consider an input/output (i.e., an interface) that is configured to read from a memory and write to the memory. The memory can be one that is located on the same IC as the interface or one that is external to the IC including the interface. An external memory is one that is "off-chip." One example of an interface is a memory controller. For an interface, the amount of time that the interface is reading from a memory may be more instructive for estimating power consumption of the interface. Alternatively, the amount of time that the interface is writing to the memory may be more instructive for power consumption of the interface. For those partitions that include an interface, are dominated by interfaces, or are made up entirely of interfaces, the time spent in a given operating state such as a read operating state or a write operating state can be used as the probability distribution parameter. Using the read operating state, the probability distribution indicates the likelihood that the partition is reading from the memory at any given time. Using the write operating state, the probability distribution indicates the likelihood that the partition is writing to the memory at any given time.

In still another example, a processor such as a central processing unit or the like may exist in any of a variety of different operating states. As such, the probability distribution parameter can indicate the probability that the processor is operating in a state under a load as opposed to begin idle, performing floating point operations, or the like.

Thus, a probability distribution can be generic and, as such, apply to all components of a partition. A probability distribution also can be qualified by component type (or function) and applied to only a subset of components of the partition. Accordingly, a switching, or toggle, rate for a block random access memory (BRAM) circuit block and a combinatorial logic switching rate can coexist in different probability distributions for a same partition since the components to which each is applied within the partition are different. Other examples can be generalized to any components that have various states in which the activity and/or enable rates vary over time.

For instance, a combinatorial logic switching rate, as opposed to a switching rate for clocked circuit elements, can be selected as a probability distribution parameter. In another example, a switching rate for a digital signal processing (DSP) circuit block can be selected as the probability distribution parameter. As noted, a switching rate for a BRAM circuit block can be selected as the probability distribution parameter, which is different from that of combinatorial logic or a DSP circuit block.

If the probability distribution parameter is specific to a particular component type, then the values for the probability distribution are only utilized for the applicable circuit structures of the partition and not applied to others. For example, a BRAM circuit block switching rate of a probability distribution for a partition is only used for the BRAM circuit blocks in the partition and not for combinatorial logic or a processor within the partition, which are associated with one or more other probability distributions.

As noted, partition 205 is associated with probability distributions 250-1, 250-2, and 250-3. In view of the foregoing, each of probability distributions 250-1, 250-2, and 250-3 can use a different probability distribution parameter. For example, partition 205 may be heterogeneous in nature and, as such, include one or more different types of circuit components, whether different elements, standard cells, circuit blocks, or the like. Consider an illustrative example in which partition 205 includes combinatorial logic, DSP circuit blocks, and BRAM circuit blocks. In that case, probability distribution 250-1 can specify a switching rate for the combinatorial logic. Probability distribution 250-2 can specify a switching rate for DSP circuit blocks.

Probability distribution 250-3 can specify a switching rate for BRAM circuit blocks or, in the alternative, an enable rate for the BRAM circuit blocks. As another illustrative example, a fourth probability distribution can be included for partition 205 so that BRAM circuit blocks have one probability distribution using BRAM circuit block switching rate as the probability distribution parameter and another probability distribution using BRAM circuit block enable rate as the probability distribution parameter.

Referring to partition 210, probability distribution 255-1 can correspond to a processor located in partition 210 and utilize a particular operating state of the processor as the probability distribution parameter. Probability distribution 255-2 can represent switching rate of one or more other circuit elements within partition 210.

The examples presented herein are provided for purposes of illustration only. It should be appreciated that each partition can be associated with one or more than one probability distribution. Each probability distribution for a partition can use a different probability distribution parameter. The number of probability distributions associated with a partition, in general, can be determined according to the various identifiable parameters that influence power consumption and which vary over time, at least for dynamic power consumption.

In another aspect, one or more probability distributions for a partition can be used to determine static power consumption. One or more components within a circuit design may have the ability to be dynamically power gated. Dynamic power gating is a technique that places a component, or a group of components, in a low power mode or a power off mode. A BRAM circuit block is one example of component that may be dynamically power gated. For such components or groups of components a probability distribution can be specified for the component or group of components for the low power mode or the power off mode. In such cases, the probability distribution indicates the likelihood that the component(s) are power gated at any given time.

Further, use of one type of probability distribution parameter for one partition does not preclude the use of another, different probability distribution parameter for the probability distribution of a different partition. For example, probability distribution 260-1 can use switching rate, while probability distribution 270-1 uses read enable, write enable, or the like. Probability distributions for different partitions may use the same probability distribution parameter or may use different probability distribution parameters. While partitions may be heterogeneous as described, partitions also may be homogeneous and utilize a single probability distribution such as illustrated for partitions 260-1 and 270-1.

Each of probability distributions 250-270 further can be implemented as any of a variety of different types of probability distributions. For example, probability distributions 250-270 can be implemented as Rayleigh, Weibull, log-normal, power law, or other type of probability distribution. The examples provided within this specification are not intended to be limiting and are not an exhaustive listing of the different types of probability distributions that can be used.

Figure 3:
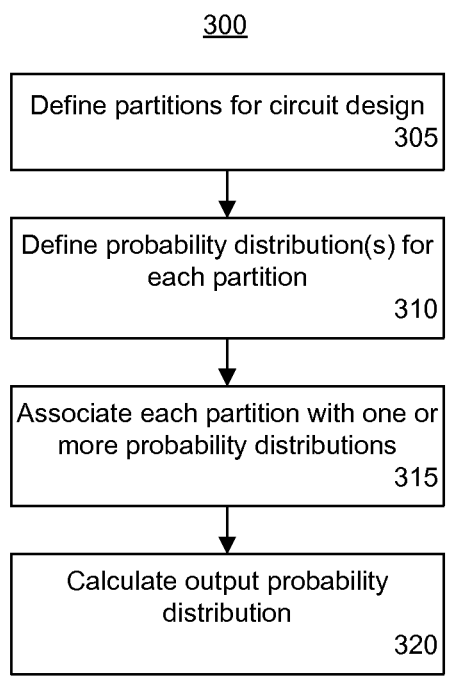
FIG. 3 is a method of estimating power consumption for a circuit design.

FIG. 3 is a method 300 of estimating power consumption for a circuit design. Method 300 can be performed by a system as described with reference to FIG. 1. The system can begin in a state where a circuit design has been loaded. It should be appreciated that the circuit design may or may not have partitions already defined therein. FIG. 3 presumes that the circuit design has not yet been partitioned.

Accordingly, in block 305, the system defines partitions for the circuit design. The partitions can be specified according to clock domain, module, component type, user preference, or the like. For example, a user can provide an input selecting a partitioning method or provide further input in the event that partitions are to be manually specified. The system defines the partitions in accordance with the received user input. In another aspect, block 305 can be optional as in the case where the partitions may already be defined within the circuit design, e.g., from use of another electronic design automation (EDA) tool.

In block 310, the system defines one or more probability distributions for each partition. The user, for example, can create probability distributions using the system. In another aspect, block 310 can be optional. For example, the probability distributions can be created or defined using another EDA tool and provided, or otherwise made available, to the system for use in performing method 300.

In block 315, each partition is associated with one or more probability distributions. In block 320, the system calculates an output probability distribution for the circuit design. In one aspect, the system performs a Monte Carlo simulation for block 320. The Monte Carlo simulation obtains a probabilistic approximation of the power consumption of the circuit design using statistical sampling techniques. The Monte Carlo simulation uses the probability distributions for the partitions of the circuit design to generate the output probability distribution specifying power consumption for the circuit design. As noted, in one aspect, the power consumption is dynamic power consumption. In another aspect, the power consumption is static power consumption. In a further aspect, the power consumption is total power consumption.

The output probability distribution specifies different power consumption values for the circuit design along with a probability for each different power consumption value. As such, a circuit designer is provided with a more detailed and realistic view of power consumption for the circuit design over other conventional techniques. Conventional techniques for power estimation typically provide one value as an estimate of average power and then simply compute another value in terms of some selected percentage above the average value for a peak power consumption estimate. The two values, however, do not provide any indication of the likelihood that either will occur, e.g., the amount of time that the circuit design will spend consuming average power or peak power. Further, the conventional techniques do not recognize power consumption other than average or peak or consider the possibility that the peak power estimation is even realistic. The output probability distribution provides a more intuitive and useful metric such as an indication of the standard deviations from the mean of different power consumption measures for the circuit design.

In accordance with the inventive arrangements disclosed within this specification, a distribution for an entire circuit design is generated indicating power consumption. A probability distribution is assigned to each partition of the circuit design. The probability distribution for the entire circuit design is calculated from the individual, partition-specific probability distributions. Monte Carlo simulation can be used to calculate the probability distribution indicating power consumption for the circuit design. As such, unique variance for switching activity, or another selected parameter, is applied to each partition, thereby allowing the effects of the partition-specific variance to be observed in the circuit design as a whole. The result is not a constant, but rather the output probability distribution for the entire circuit design indicating how power varies over time with non-constant activity from partition to partition. Further, by modifying the probability distribution for one or more selected partitions, a user is able to determine how the changed behavior of the selected partitions influences power consumption for the entire circuit design.

As known, changes in dynamic power affect both static power consumption and the total power consumption of the circuit design. For example, as more dynamic power is dissipated from a circuit, junction temperatures within the circuit increase. Static power has an exponential relationship over temperature and, as such, is dependent upon dynamic power consumption. Accordingly, in another aspect, the system can be programmed or configured to calculate a probability distribution for total power consumption of the circuit design utilizing the output probability distribution for dynamic power. In one example, the system can calculate total power consumption as described using the probability distributions and, for each point calculation, correlate the various switching rates of the partitions with temperature to incorporate a static power calculation, whether performed as described herein or using another static power estimation technique.

The calculation (e.g., Monte Carlo simulation) of an output probability distribution specifying power consumption for the circuit design can be repeated as may be required where one or more or all of the partitions are associated with different probability distributions to simulate or model different behaviors as may be required. Further, since each point calculation is independent of the others, a computing farm including a plurality of data processing systems can be utilized for large runs. A point calculation refers to the power consumption calculation of the circuit design after a random point from each probability distribution has been applied in the system. Each data processing system can be apportioned one or more point calculations in parallel to effectuate faster runtime in calculating the output probability distribution for the circuit design.

For purposes of explanation, specific nomenclature is set forth to provide a thorough understanding of the various inventive concepts disclosed herein. The terminology used herein, however, is for the purpose of describing particular embodiments only and is not intended to be limiting.

The terms "a" and "an," as used herein, are defined as one or more than one. The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system.

The term "and/or" as used herein refers to and encompasses any and all possible combinations of one or more of the associated listed items. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof. It will also be understood that, although the terms first, second, etc. may be used herein to describe various elements, these elements should not be limited by these terms, as these terms are only used to distinguish one element from another.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

One or more aspects disclosed within this specification can be realized in hardware or a combination of hardware and software. One or more aspects can be realized in a centralized fashion in one system or in a distributed fashion where different elements are spread across several interconnected systems. Any kind of data processing system or other apparatus adapted for carrying out at least a portion of the methods described herein is suited.

One or more aspects further can be embedded in a computer program product, which includes all the features enabling the implementation of the methods described herein. The computer program product includes a data storage medium which is a non-transitory computer-usable or computer-readable medium, storing program code that, when loaded and executed in a system including a processor, causes the system to initiate and/or perform at least a portion of the functions and/or operations described within this specification. Examples of data storage media can include, but are not limited to, optical media, magnetic media, magneto-optical media, computer memory such as random access memory, a bulk storage device, e.g., hard disk, or the like.

Accordingly, the flowchart and block diagrams in the Figures illustrate the architecture, functionality, and operation of possible implementations of systems, methods and computer program products according to various embodiments of the one or more embodiments disclosed herein. In this regard, each block in the flowchart or block diagrams may represent a module, segment, or portion of code, which includes one or more executable instructions for implementing the specified logical function(s). It should also be noted that, in some alternative implementations, the functions noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terms "computer program," "software," "application," "computer-usable program code," "program code," "executable code," variants and/or combinations thereof, in the present context, mean any expression, in any language, code or notation, of a set of instructions intended to cause a data processing system to perform a particular function either directly or after either or both of the following: a) conversion to another language, code, or notation; b) reproduction in a different material form. For example, program code can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

Thus, throughout this specification, statements utilizing terms such as "processing" or "computing" or "calculating" or "determining" or "displaying" or the like, refer to the action and processes of a data processing system, e.g., a computer system, or similar electronic computing device, that manipulates and transforms data represented as physical (electronic) quantities within the computer system's registers and/or memories into other data similarly represented as physical quantities within the computer system memories and/or registers or other such information storage, transmission or display devices.

The corresponding structures, materials, acts, and equivalents of all means or step plus function elements in the claims below are intended to include any structure, material, or act for performing the function in combination with other claimed elements as specifically claimed.

The features disclosed within this specification can be embodied in other forms without departing from the spirit or essential attributes thereof. Accordingly, reference should be made to the following claims, rather than to the foregoing specification, as indicating the scope of such features and implementations.

What is claimed is:

1. A method, comprising:
    associating, using a processor, each partition of a plurality of partitions of a circuit design with a probability distribution;
    wherein each partition is a portion of the circuit design;
    wherein for each partition, the associated probability distribution specifies a non-constant switching rate of an output of the partition indicating a variance in power consumption of the partition; and calculating, using the processor, an output probability distribution specifying a variance in power consumption of the circuit design according to the probability distribution of each partition of the circuit design;

wherein the circuit design is used to implement an electronic circuit and is in the form of a netlist or a hardware description language;

wherein each partition is a clock region or a circuit module; and wherein calculating the output probability distribution specifies the variance in power consumption of the circuit design using Monte Carlo simulation, the Monte Carlo simulation implements random point calculations for the partitions, and each partition point calculation is independent of other partition point calculations.

2. The method of claim 1, wherein a selected partition of the plurality of partitions is associated with a first probability distribution and a second probability distribution; and
wherein the first probability distribution uses a first probability distribution parameter and the second probability distribution uses a second probability distribution parameter different from the first probability distribution parameter.

3. The method of claim 2, wherein the selected partition comprises components belonging to a first component type and components belonging to a second and different component type:
the first probability distribution parameter is used only for components of the first component type within the selected partition; and
the second probability distribution parameter is used only for components of the second component type within the selected partition.

4. The method of claim 1, wherein each partition of the circuit design is a clock region having a clock signal that is independent of the other partitions.

5. The method of claim 1, further comprising:
defining the plurality of partitions of the circuit design according to a received input specifying partitioning criteria.

6. The method of claim 1, wherein:
a first probability distribution of a first partition of the plurality of partitions uses a first probability distribution parameter; and
a second probability distribution of a second partition of the plurality of partitions uses a second probability distribution parameter different from the first probability distribution parameter.

7. The method of claim 1, wherein:
the output probability distribution comprises a plurality of power consumption values for the circuit design; and
each power consumption value is associated with a probability of power consumption for the circuit design being the power consumption value.

8. The method of claim 7, wherein the output probability distribution indicates standard deviations from a mean of different power consumption measures for the circuit design.

9. The method of claim 1, wherein:
at least one other partition of the circuit design comprises a memory controller and is associated with a further probability distribution; and
the further probability distribution specifies time spent by the memory controller in a write enable operating state and a read enable operating state.

10. The method of claim 1, wherein:
at least one other partition comprises a processor and is associated with a further probability distribution; and
the further probability distribution specifies time spent by the processor operating under load and being idle.

11. A system, comprising:
a processor coupled to a memory storing program code, wherein the processor, upon executing the program code, is programmed to initiate executable operations comprising:
associating each partition of a plurality of partitions of a circuit design with a probability distribution;
wherein each partition is a portion of the circuit design;
wherein for each partition, the associated probability distribution specifies a non-constant switching rate of an output of the partition indicating a variance in power consumption of the partition; and
calculating an output probability distribution specifying a variance in power consumption of the circuit design over time according to the probability distribution of each partition of the circuit design;
wherein the circuit design is used to implement an electronic circuit and is in the form of a netlist or a hardware description language;
wherein each partition is a clock region or a circuit module; and
wherein calculating an output probability distribution specifies a variance in power consumption of the circuit design using Monte Carlo simulation, the Monte Carlo simulation implements random point calculations for the partitions, and each partition point calculation is independent of an order of the partitions other partition point calculations.

12. The system of claim 11, wherein a selected partition of the plurality of partitions is associated with a first probability distribution and a second probability distribution; and
wherein the first probability distribution uses a first probability distribution parameter and the second probability distribution uses a second probability distribution parameter different from the first probability distribution parameter.

13. The system of claim 12, wherein the selected partition comprises components belonging to a first component type and components belonging to a second and different component type:
the first probability distribution parameter is used only for components of the first component type within the selected partition; and
the second probability distribution parameter is used only for components of the second component type within the selected partition.

14. The system of claim 11, wherein:
a first probability distribution of a first partition of the plurality of partitions is for a first probability distribution parameter; and
a second probability distribution of a second partition of the plurality of partitions is for a second probability distribution parameter different from the first probability distribution parameter.

15. The system of claim 11, wherein:
the output probability distribution comprises a plurality of power consumption values for the circuit design; and
each power consumption value is associated with a probability of power consumption for the circuit design being the power consumption value.

16. The system of claim 11, wherein:
at least one other partition comprises a processor and is associated with a further probability distribution; and
the further probability distribution specifies time spent by the processor operating under load and being idle.

17. A non-transitory computer-readable medium having instructions which, when executed by a processor, perform a method comprising:
associating, using the processor, each partition of a plurality of partitions of a circuit design with a probability distribution;
wherein each partition is a portion of the circuit design;
wherein for each partition, the associated probability distribution specifies a non-constant switching rate of an output of the partition indicating a variance in power consumption of the partition; and
calculating, using the processor, an output probability distribution specifying a variance in power consumption of the circuit design according to the probability distribution of each partition of the circuit design;
wherein the circuit design is used to implement an electronic circuit and is in the form of a netlist or a hardware description language;
wherein each partition is a clock region or a circuit module; and
wherein calculating an output probability distribution specifies a variance in power consumption of the circuit design using Monte Carlo simulation, the Monte Carlo simulation implements random point calculations for the partitions, and each partition point calculation is independent of other partition point calculations.

18. The non-transitory computer-readable medium of claim 17, wherein a selected partition of the plurality of partitions is associated with a first probability distribution and a second probability distribution; and
wherein the first probability distribution uses a first probability distribution parameter and the second probability distribution uses a second probability distribution parameter different from the first probability distribution parameter.

19. The non-transitory computer-readable medium of claim 17, wherein:
a first probability distribution of a first partition of the plurality of partitions is for a first probability distribution parameter; and
a second probability distribution of a second partition of the plurality of partitions is for a second probability distribution parameter different from the first probability distribution parameter.

20. The non-transitory computer-readable medium of claim 17, wherein:
the output probability distribution comprises a plurality of power consumption values for the circuit design; and
each power consumption value is associated with a probability of power consumption for the circuit design being the power consumption value.

* * * * *